US010254140B2

(12) United States Patent
D'Mello

(10) Patent No.: US 10,254,140 B2
(45) Date of Patent: Apr. 9, 2019

(54) SIIS LEVEL 2 SENSOR OFFSET DISTANCE EXTENDER

(71) Applicant: GE Oil & Gas UK Limited, Bristol (GB)

(72) Inventor: Reagan D'Mello, Bristol (GB)

(73) Assignee: GE Oil & Gas UK Limited, Bristol (GB)

( * ) Notice: Subject to any disclaimer, the term of this patent is extended or adjusted under 35 U.S.C. 154(b) by 689 days.

(21) Appl. No.: 14/561,337

(22) Filed: Dec. 5, 2014

(65) Prior Publication Data

US 2015/0160051 A1  Jun. 11, 2015

(30) Foreign Application Priority Data

Dec. 6, 2013 (GB) .................................. 1321555.3

(51) Int. Cl.
| | |
|---|---|
| *G01C 19/20* | (2006.01) |
| *G01D 18/00* | (2006.01) |
| *E21B 49/00* | (2006.01) |
| *E21B 47/00* | (2012.01) |
| *H04L 12/40* | (2006.01) |
| *G01V 1/22* | (2006.01) |

(52) U.S. Cl.
CPC ......... *G01D 18/00* (2013.01); *E21B 47/0001* (2013.01); *E21B 49/001* (2013.01); *H04L 12/40006* (2013.01); *H04L 12/40169* (2013.01); *G01V 1/22* (2013.01)

(58) Field of Classification Search
CPC ... E21B 47/0001; E21B 49/001; G01D 18/00; H04L 12/40006; H04L 12/40169; G01V 1/22

USPC .......................................................... 702/104
See application file for complete search history.

(56) References Cited

U.S. PATENT DOCUMENTS

| | | | | |
|---|---|---|---|---|
| 4,524,349 A | * | 6/1985 | Hyatt ................... | G08B 25/018 340/500 |
| 4,528,839 A | * | 7/1985 | Blanchard ........... | G01F 25/0061 324/601 |
| 5,734,658 A | | 3/1998 | Rall et al. | |
| 7,876,427 B1 | * | 1/2011 | Melvin ................ | G01M 11/064 356/121 |
| 9,577,601 B2 | * | 2/2017 | Kristiansen ......... | G06F 13/4081 |
| 2008/0161659 A1 | * | 7/2008 | Reichenberger ..... | A61B 5/0002 600/301 |

(Continued)

OTHER PUBLICATIONS

European Search Report and Written Opinion issued in connection with corresponding EP Application No. 14196449.4-1862 dated Mar. 6, 2015.

(Continued)

*Primary Examiner* — Fernando Hidalgo
(74) *Attorney, Agent, or Firm* — GE Global Patent Operation; Robert D. Crawford, II

(57) ABSTRACT

A method of increasing the maximum offset distance for underwater sensors, the method including the steps of: providing at least one sensor on a sensor bus, and emulating at least one additional sensor on the sensor bus. This has the effect of lowering the total network resistance, which increases the maximum possible offset distance. The additional sensor(s) by be emulated by one of: a smart plug-in module, a printed circuit board assembly, and a virtual sensor.

34 Claims, 8 Drawing Sheets

(56) References Cited

U.S. PATENT DOCUMENTS

| | | | |
|---|---|---|---|
| 2009/0138241 A1* | 5/2009 | Parachini | G01D 21/00 702/188 |
| 2012/0271570 A1* | 10/2012 | Paik | G01D 4/004 702/57 |
| 2013/0345926 A1* | 12/2013 | Boulton | G01M 17/007 701/32.8 |
| 2014/0156899 A1* | 6/2014 | Kristiansen | G06F 13/4081 710/305 |

OTHER PUBLICATIONS

Saul, "Subsea instrumentation interface standardization in the offshore oil and gas industry", IEEE International Conference on Communications, ICC, pp. 08-13-08-18, Jun. 11, 2006.

GB Search Report dated Jun. 2, 2014 which was issued in connection with GB Patent Application No. 1321555.3 which was filed on Dec. 6, 2013.

\* cited by examiner

SIIS LEVEL 2 SENSOR OFFSET DISTANCE EXTENDER

BACKGROUND

Embodiments of the invention relate to a method for increasing the maximum offset distance for underwater sensors compliant with subsea instrumentation interface standard (SIIS) Level 2, for example CANbus Fault Tolerant, connected to subsea modules, for example subsea control modules (SCMs) or power and communication distribution modules (PCDMs). A sensor bus which implements the method is also claimed.

SIIS is the Subsea Instrumentation Interface Standard being defined and in use by the offshore oil and gas Industry. It seeks to create a common platform for implementation of subsea sensors. SIIS Level 2 applies to a family of digital serial devices. The current implementation of SIIS Level 2 is a CANbus Fault Tolerant physical Layer (with CANOpen protocol).

The implementation of a SIIS Level 2 sensor network is impacted by a number of parameters, such as: number of sensor nodes, baud rate, bit sampling point, cable capacitance, and termination resistance.

These parameters constrain the maximum offset distance the sensor may reach away from the subsea control module (or similar subsea module). The 'offset distance' is the length of the cables connecting a sensor to the subsea control module. In a star network topology this is equivalent to the sum of the length of cable from the sensor to the cable split plus the length of cable from the cable split to the subsea control module.

Each parameter is considered in turn below:

Controlled Parameters

The number of nodes is defined by the customer on a project-by-project basis. It is dependent on the subsea field layout. Each node represents a sensor in the SIIS Level 2 network.

The baud rate is the communication speed. SIIS Level 2 has defined, fixed and controlled this within the SIIS Recommended Practices. It is set to 50 kbps (default) with higher speed option of 125 kbps.

Uncontrolled Variables

Bit sampling point is defined but prone to variations between 75% and 92.5% (87.5% nominal). The higher the sample rate, the further the maximum possible offset distance; conversely, the lower the sample rate, the shorter the maximum possible offset distance, for SIIS Level 2 sensor networks.

Cable capacitance is defined but prone to variations. These variations arise from total cable length, tolerances, supplier quality and environmental effects (especially pressure). SIIS Level 2 defines this to 40 pF/m, 120 ohms at 1 MHz. The influence of pressure increases the pF/m capacitance value. For longer runs of cable, this becomes even more significant. The lower the total capacitance, the further the distance; the higher the capacitance, the shorter the distance, for SIIS Level 2 sensor networks.

Controlling Variable

Termination resistance impacts the total resistance in the system. The total resistance has the ability to mitigate the adverse effects of cable capacitance and bit sampling on offset distance. More termination resistances in the system should lead to lower total resistance and an increase in the maximum possible offset distance; conversely, fewer termination resistances in the system generally leads to a higher total resistance, and a shortening of the maximum possible offset distance.

A termination resistance is inherent within each sensor. The more sensors, the greater the maximum possible offset distance. Once sensors are installed, the total resistance of the system becomes a fixed and known entity. The full capacity of sensors is almost never utilised in practise, as underwater sensors are expensive and so it is not cost-effective to include additional sensors over the minimum number required in the system.

SUMMARY OF THE INVENTION

The problem solved by embodiments of the present invention is that it may be desirable to place an underwater sensor further away from a subsea control module than is practicable with the number of sensors on the bus, due to environmental factors which adversely affect integrity of the digital signal in the network.

Embodiments of the present invention overcome this problem by emulating sensors, i.e. adding termination resistances into the SIIS Level 2 sensor network without the need for the expensive sensors that go with it. It uses the spare unused capacity of the sensor network to boost the maximum offset distance achievable by the actual installed sensors.

Embodiments of the present invention provide a way to utilise added termination resistances to compensate for the unknown and uncontrollable elements which adversely impact maximum offset distance achievable for the sensors in the SIIS Level 2 network.

According to the present invention from a first aspect, there is provided a method of increasing the maximum offset distance for underwater sensors comprising the steps of providing a sensor bus comprising at least one sensor, and emulating at least one additional sensor on the sensor bus.

The at least one additional sensor could be emulated by a smart plug-in module, a printed circuit board assembly, or a virtual sensor.

The step of emulating at least one additional sensor on the sensor bus could comprise emulating additional sensors up to the maximum capacity of the sensor bus.

The sensor bus could be in accordance with the subsea instrumentation interface standard.

The at least one additional sensor could be emulated as a sensor connected in a star topology network, or as a sensor connected in a daisy chain topology network.

The sensor bus could be connected to a subsea control module. The at least one additional sensor could be emulated between the subsea control module and the sensor bus, or within the subsea control module. The subsea control module could comprise a subsea electronic module. The at least one additional sensor could be emulated within the subsea electronic module.

The step of emulating at least one sensor on the sensor bus could comprise connecting at least one termination resistance to the sensor bus in parallel. At least one termination resistance could be switchably connected to the sensor bus. At least one termination resistance could be a variable resistance.

The method could be performed in an underwater hydrocarbon extraction facility.

According to the present invention from a second aspect, there is provided a sensor bus comprising: at least one sensor, and an emulator for emulating at least one additional sensor on the sensor bus.

The at least one additional sensor could be emulated by a smart plug-in module, a printed circuit board assembly or a virtual sensor.

The emulator could emulate additional sensors up to the maximum capacity of the sensor bus.

The sensor bus could be in accordance with the subsea instrumentation interface standard.

The at least one additional sensor could be emulated as a sensor connected in a star topology network, or as a sensor connected in a daisy chain topology network.

The sensor bus could be connected to a subsea control module. The emulator could be disposed between the subsea control module and the sensor bus, or within the subsea control module. The subsea control module could comprise a subsea electronic module. The emulator could be disposed within the subsea electronic module.

The emulator could comprise at least one termination resistance connected to the sensor bus in parallel. At least one termination resistance could be switchably connected to the sensor bus. At least one termination resistance could be a variable resistance.

The sensor bus could be used in an underwater hydrocarbon extraction facility.

The apparatus and methodology proposed by the present invention is compatible to SIIS Level 2 with CANbus physical layer implementation. The protocol choice does not impact the operation of the invention. It is independent of chosen protocol, but dependent on physical layer.

A subsea field with fewer sensors (say two) can span distances typical of more sensors (say six) by using an emulator to 'pretend' to be four sensor slots in the network. The emulator is not restricted to set number and may fill between zero to the maximum capacity of SIIS Level 2 sensor slots, as required.

The SIIS Level 2 emulator must be connected in parallel to other SIIS sensor nodes.

SIIS Level 2 emulator is not constrained to a single method of packaging. The item may take the form of a printed circuit board assembly (PCBA), a module suitable for direct exposure to seawater at depth (i.e. marinised), or a module contained within the subsea control module (or a similar subsea module).

DETAILED DESCRIPTION

Figure 1:
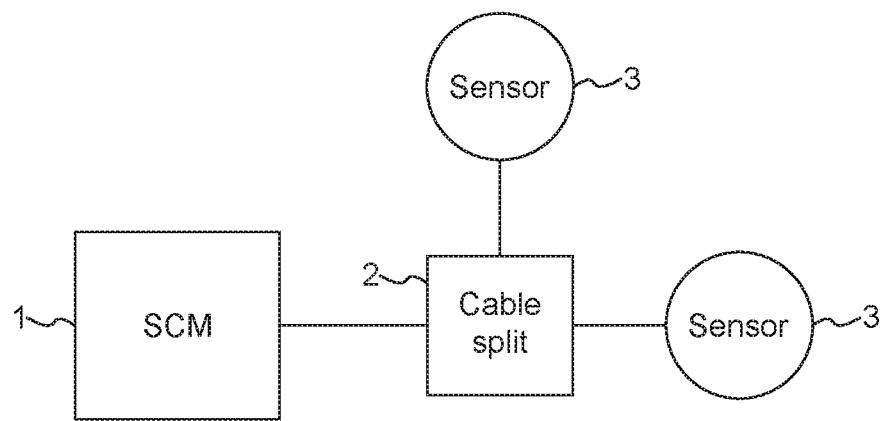
FIG. 1 is a schematic diagram of a prior art star topology sensor bus.
Figure 2:
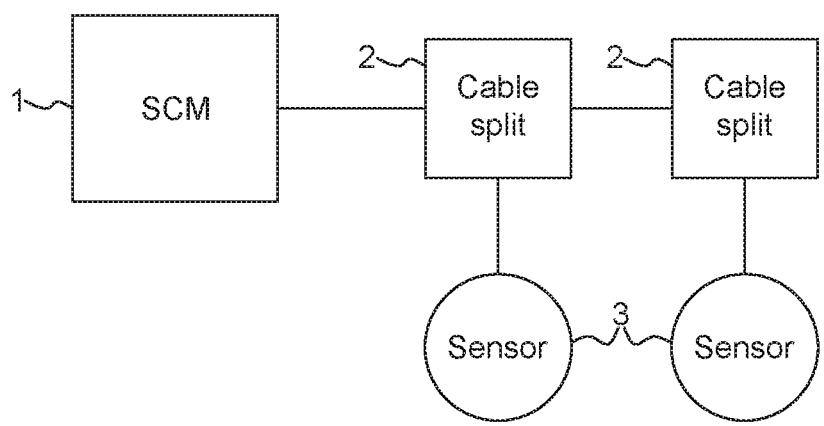
FIG. 2 is a schematic diagram of a prior art daisy chain topology sensor bus.

FIGS. 1 and 2 show two different prior art network topologies of sensor buses used in subsea networks.

FIG. 1 shows a star topology, in which a subsea control module (SCM) 1 is connected to a cable split 2. From the cable switch two sensors 3 are connected.

FIG. 2 shows a daisy chain topology. The SCM 1 is connected to two cable splits 2 in series. The cable splits 2 have sensors 3 connected to them.

Figure 3:
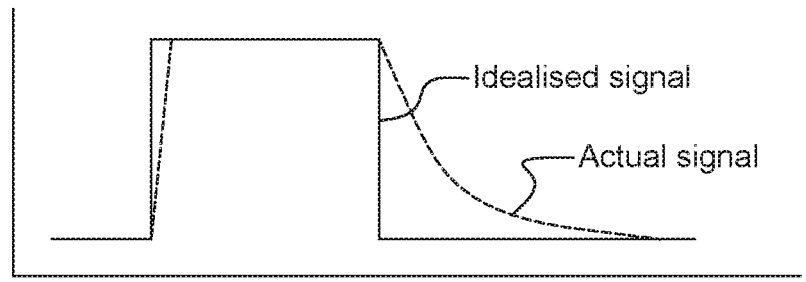
FIG. 3 is a graph showing the ideal voltage profile for a communications signal in a subsea network and the actual voltage profile encountered in practice.

A typical digital signal for use in such subsea networks is represented in FIG. 3. An idealised signal is represented by the square wave shown in solid line. The dotted line represents the actual signal encountered in practice due to environmental factors.

Figure 4:
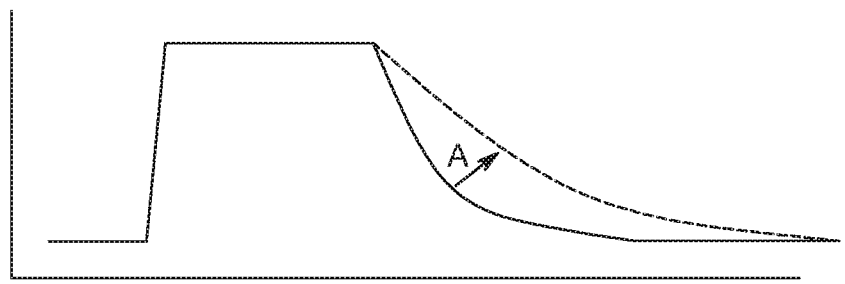
FIG. 4 is a graph showing increased adverse effects on the actual voltage profile.

As the cable capacitance increases—for example, due to pressure, aging or increased distance—the digital waveform is skewed even more. Variances in bit sampling exacerbate the effect. This skewing of the signal adversely impacts the signal integrity and results in information loss. These increased adverse effects are illustrated by the arrow A in FIG. 4. The actual signal, shown in solid line, is moved even further away from the idealised square wave towards the signal shown in dotted line.

One way to recover this signal is to decrease the total resistance in the system. This can be done by either adding additional sensors in the communications network (an expensive and impractical solution) or through the emulator used in the present invention.

The cumulative effect is to minimise the negative impact on the RC time constant or establish a measure of control on the RC time constant of the system, by counteracting the uncontrolled variable changes with changes to the controlled variable.

The emulator used in the present invention adds termination resistances (for example, those defined by subsea instrumentation interface standard (SIIS) to the network. Since it is connected in parallel the overall system resistance decreases. This has an effect of improving the signal integrity, and prevents information loss over longer distances.

Figure 5:
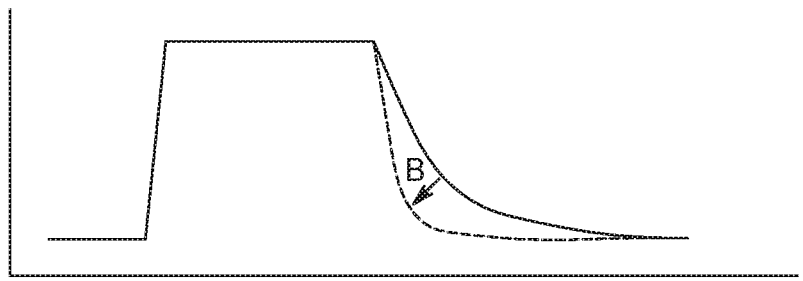
FIG. 5 is a graph showing the effects of decreasing the total network resistance on the actual voltage profile.

FIG. 5 shows the effect of decreasing total network resistance. Arrow B shows the actual signal, shown in solid line, moving back towards the idealised square wave towards the signal shown in dotted line.

Typical SIIS defined termination resistance is 1500 ohms. This value is defined in the SIIS Recommended Practice. The emulator is able to mirror subsequent changes in the standard defined values.

The emulator is not restricted to using the standard defined values. The emulator may break from the SIIS umbrella to develop a customer focused bespoke solution if required to meet the project needs.

Figure 6:
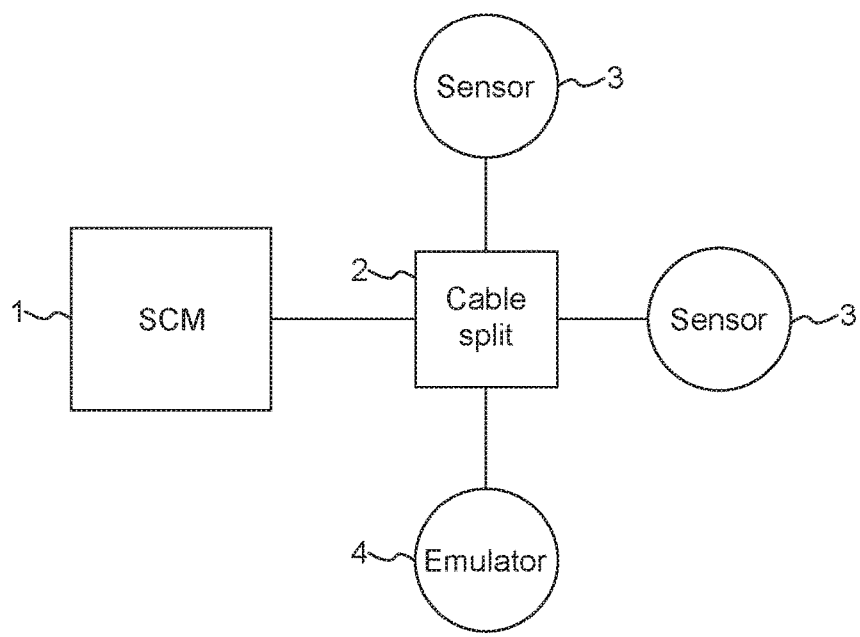
FIG. 6 is a schematic diagram of a star topology sensor bus incorporating an emulator according to an embodiment of the invention.
Figure 7:
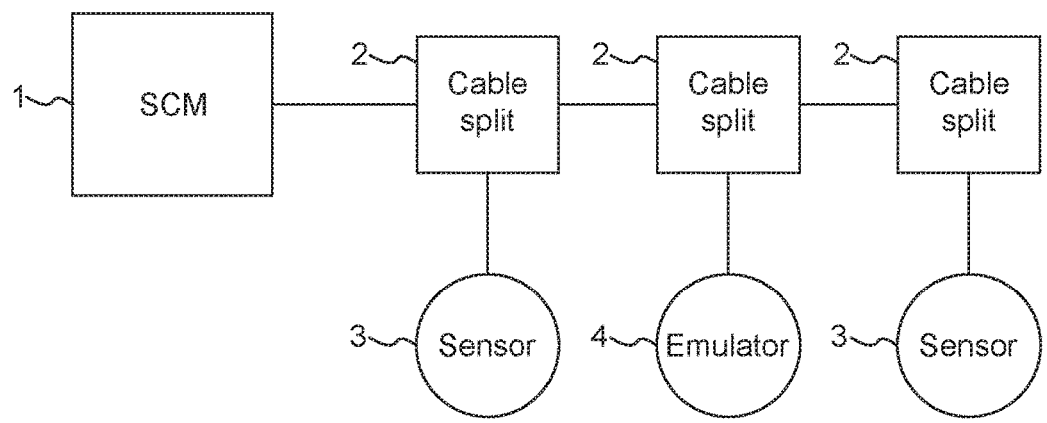
FIG. 7 is a schematic diagram of a daisy chain topology sensor bus incorporating an emulator according to an embodiment of the invention.
Figure 8:
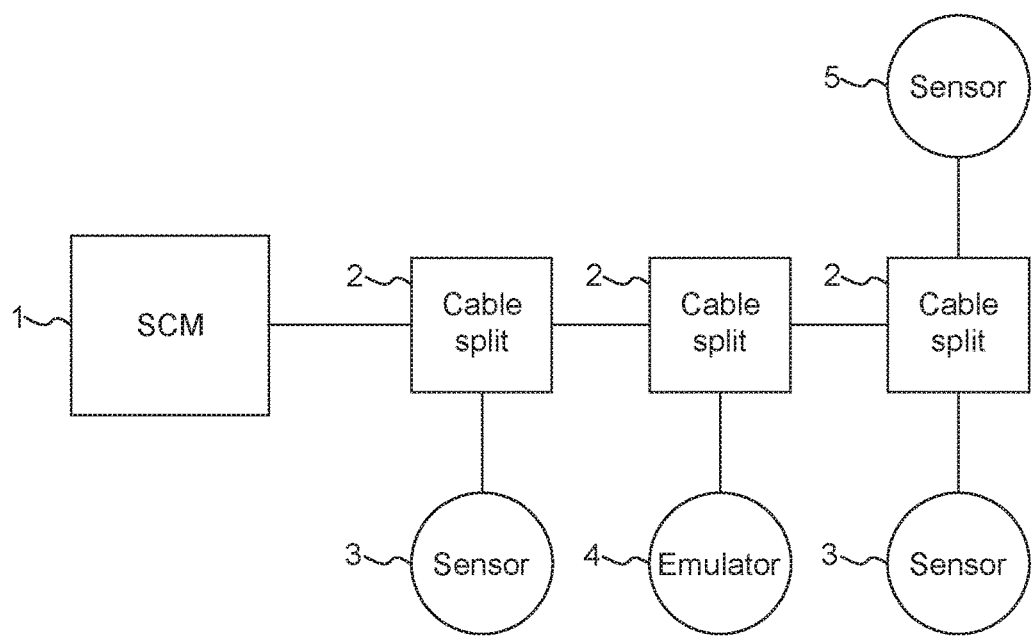
FIG. 8 is a schematic view of schematic diagram of a star and daisy chain combined topology sensor bus incorporating an emulator according to an embodiment of the invention.

FIGS. 6 to 8 show different exemplary placements of the emulator in the network.

FIGS. 6 and 7 show network topologies based on FIGS. 1 and 2 respectively, each modified to include the emulator of the present invention. Like components retain their reference numerals where appropriate.

FIG. 6 shows a star topology, in which a subsea control module (SCM) 1 is connected to a cable split 2. From the cable switch two sensors 3 are connected, as well as an emulator 4. This will be described in more detail below.

FIG. 7 shows a daisy chain topology. The SCM 1 is connected to three cable splits 2 in series. The first and third cable splits 2 have sensors 3 connected to them, and the second cable split 2 has an emulator 4 according to an embodiment of the invention connected to it.

FIG. 8 shows a topology consisting of star and daisy chain combined. The arrangement is similar that shown for FIG. 2, except that in this case the third cable split 3 has a further sensor 5 connected to it.

Again, like components retain their reference numerals where appropriate.

It should be noted that emulators may be placed in various locations in connection with the network.

Figure 9:
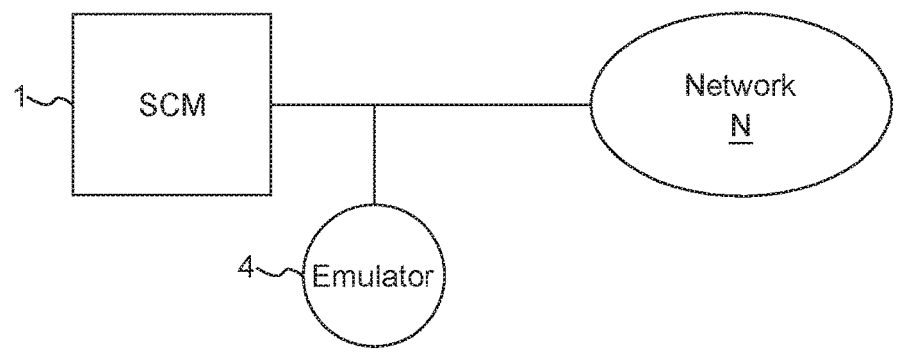
FIG. 9 is a schematic diagram of an emulator connected between a subsea control module and a network according to an embodiment of the invention.

FIG. 9 shows a SCM 1 connected to a network N. The network can be any of star topology, daisy chain topology, or a combined star and daisy chain topology as shown in FIGS. 1 to 3. In this embodiment, the emulator is connected between the SCM 1 and the network N.

Figure 10:
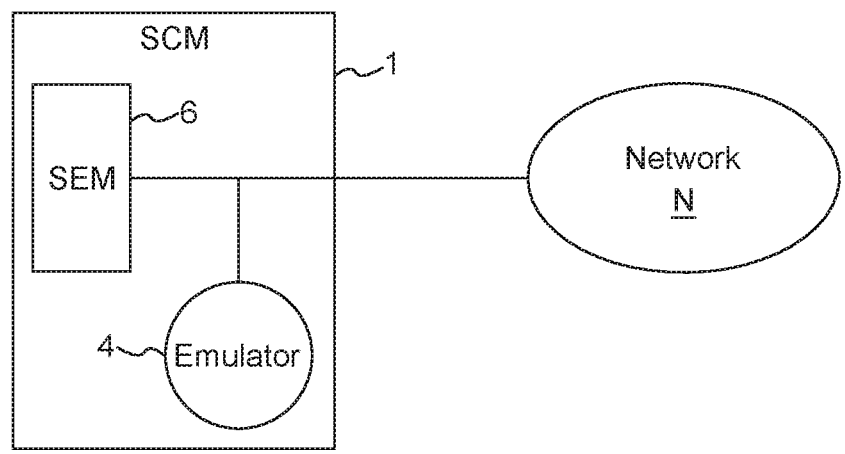
FIG. 10 is a schematic diagram of an emulator located within a subsea control module according to an embodiment of the invention.

FIG. 10 shows a SCM 1 connected to a network N. The SCM 1 houses a subsea electronics module (SEM) 6. The emulator 4 is connected between the SEM 6 and the network N, and is also housed within the SCM.

Figure 11:
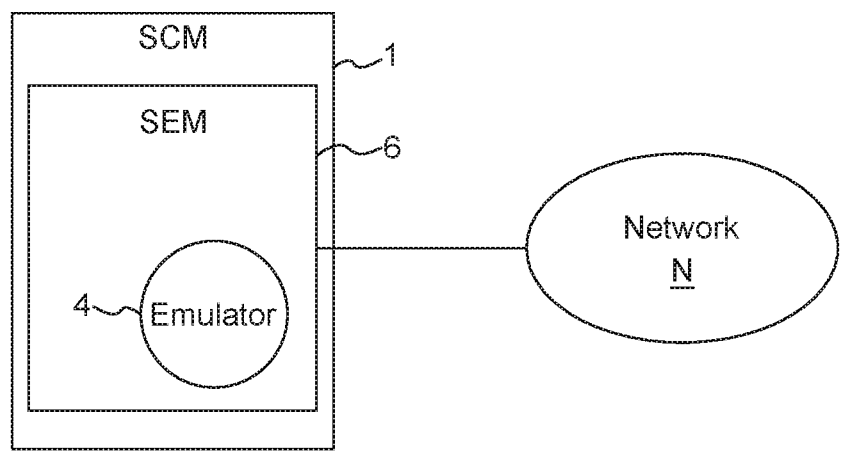
FIG. 11 is a schematic diagram of an emulator located within a subsea electronics module within a subsea control module according to an embodiment of the invention.

FIG. 11 show a SCM 1 connected to a network N. The SCM 1 houses a SEM 6, and the emulator 4 is housed within the SEM 6.

Figure 12B:
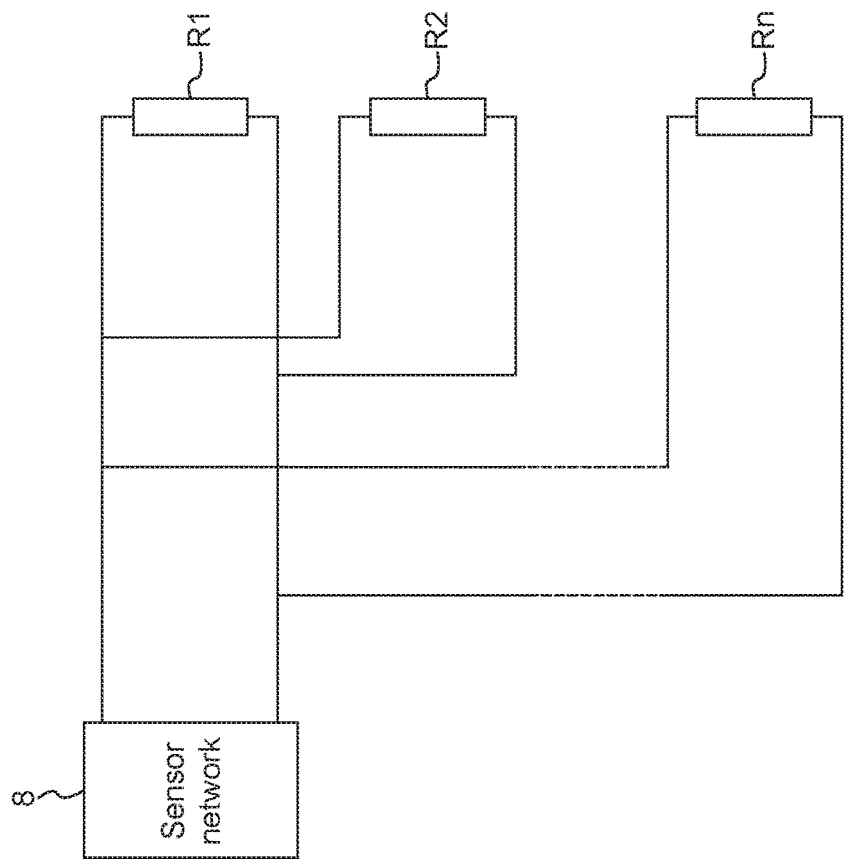
FIGS. 12A and 12B each show a schematic diagram of an emulator according to an embodiment of the invention.
Figure 12A:
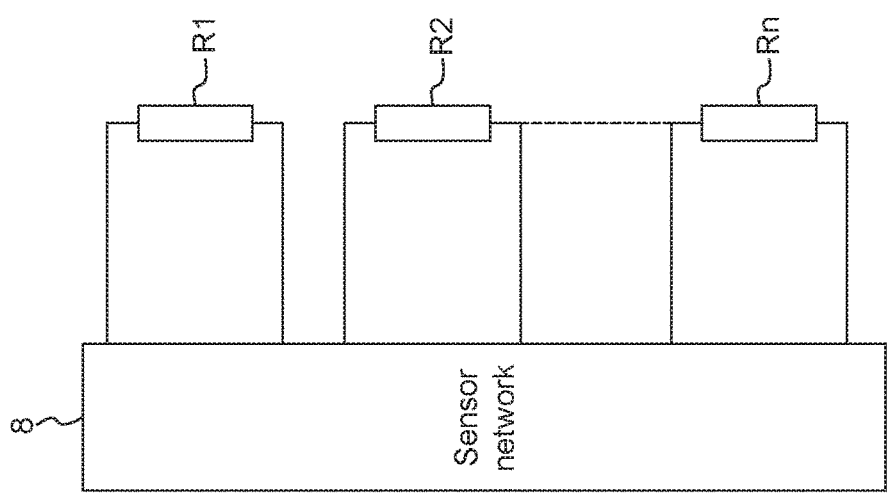
Figure 13B:
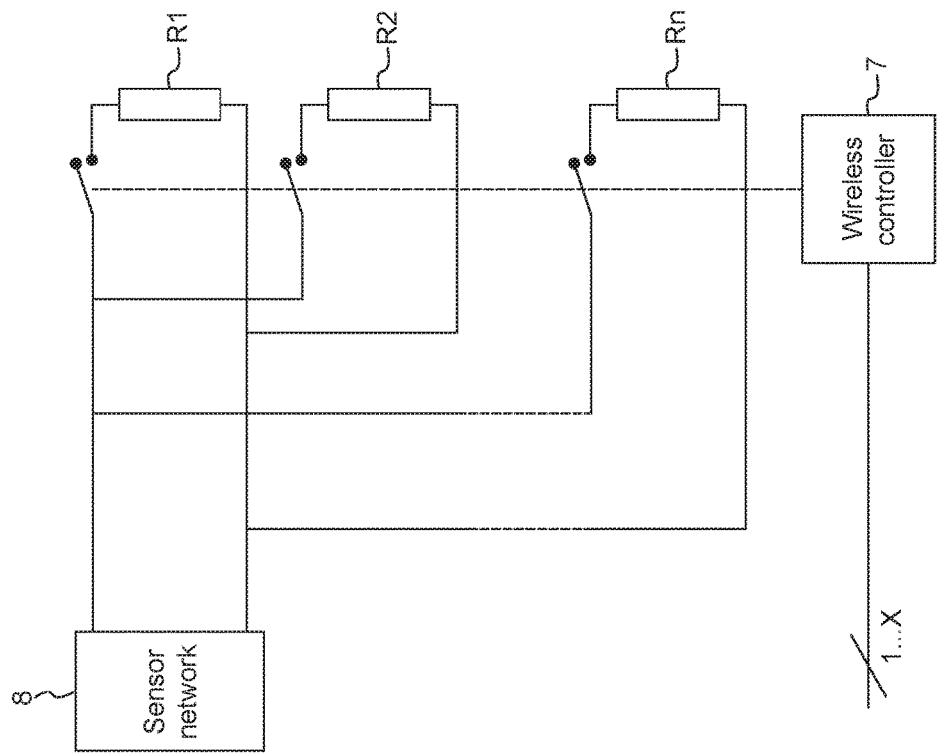
FIGS. 13A and 13B each show a schematic diagram of an emulator according to an embodiment of the invention.
Figure 13A:
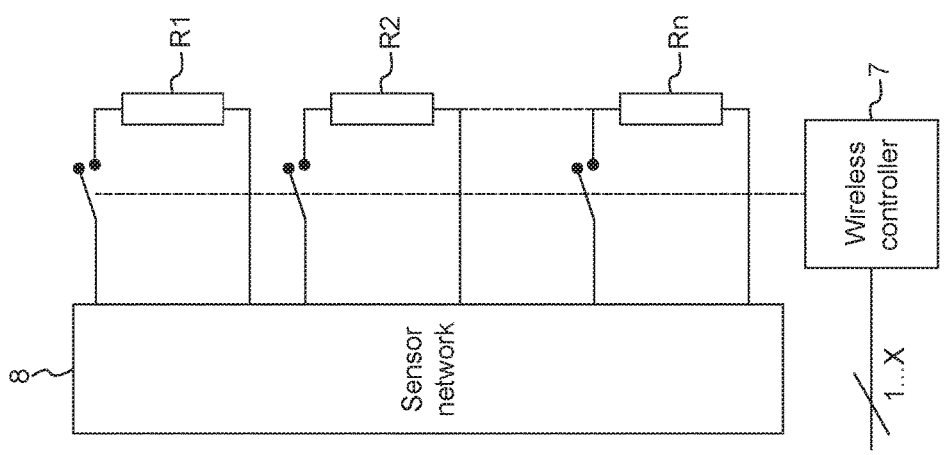
Figure 14B:
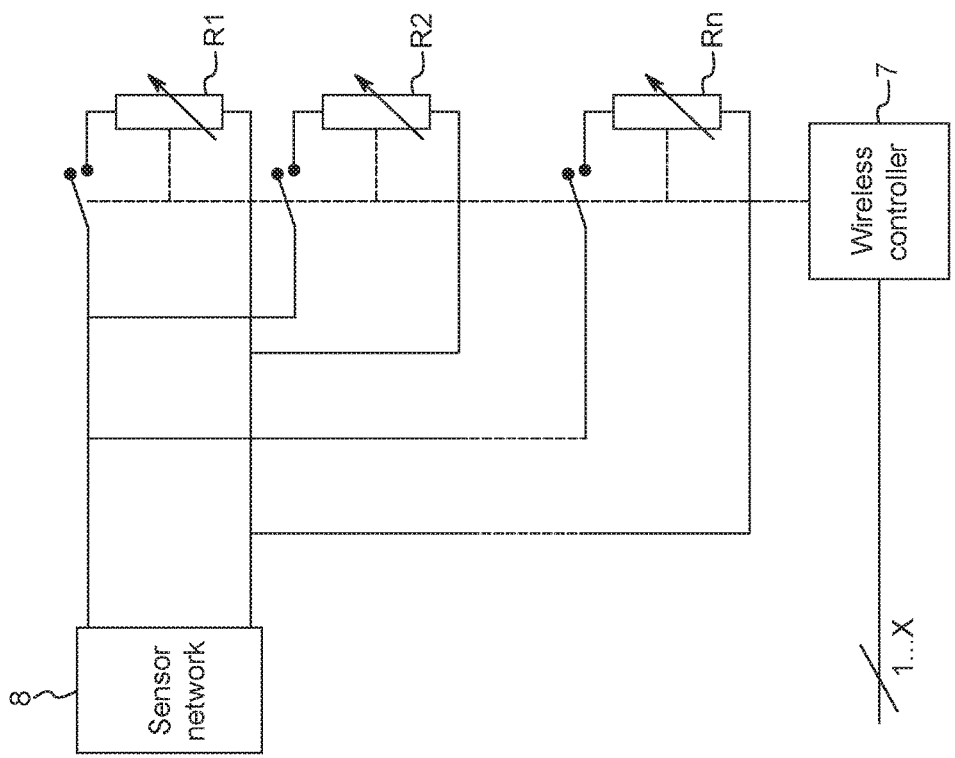
FIGS. 14A and 14B each show a schematic diagram of an emulator according to an embodiment of the invention.
Figure 14A:
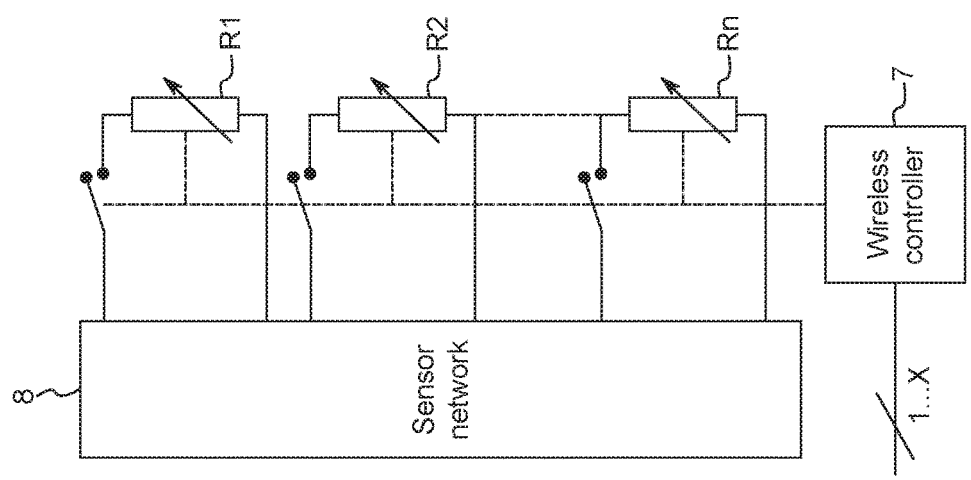

FIGS. 12A to 14B show various methods of implementing the detailed design, respectively using:

Fixed termination resistances
Switchable fixed-value termination resistances
Switchable variable-value termination resistances Each of FIGS. 12A-14B show a possible emulator design, FIGS. 12A, 13A and 14A showing each of the termination resistances $R_1$ to $R_n$ connected individually in parallel to a sensor network 8, and FIGS. 12B, 13B and 14B showing the termination resistances $R_1$ to $R_n$ connected to a single parallel connection to a sensor network 8.

The switchable elements within the emulators shown in FIGS. 13A, 13B, 14A and 14B may be controlled remotely through a wired or wireless controller 7. Each termination resistance, $R_1$ to $R_n$, in the network forms an additional parallel connection in the total sensor network, further reducing the total resistance. In subsea applications, n will typically be less than, or equal to 9, this number being derived from SIIS recommended practice.

The emulator may optionally have a common ground for the termination resistances $R_1$ to $R_n$ to allow for discharge path for the signal (not illustrated). Similarly, the device may optionally have a common line for the termination resistances $R_1$ to $R_n$ connecting to a return power line of the network, in place of a common ground (not illustrated). The emulator can be considered as a permanent-set-to-recessive-device as per CANbus Physical Layer, SIIS Level 2 implementation.

The emulator may be further expanded to allow for SIIS approved power supplies to form part of the system loop.

The above-described embodiments are exemplary only. Various modifications will be apparent to those skilled in the art.

There are other benefits which arise from embodiments of the invention, including:

A safety error margin is introduced in the commissioning of new fields. For example, if three sensors are deployed near the cusp of their maximum distance limit, pressure or other effects may affect the system adversely so that this system does not work. The emulator can add a termination resistance into the system to increase the maximum distance limit, thereby allowing for the system to operate. This removes the need for retrieving equipment from subsea or changing equipment.

An installed field is subject to degradation over the course of its operating life. This has typically been 25 years but is increasing to 40 years. System elements including those in the SIIS Level 2 network degrade over time affecting timing and communication parameters and may render previously operating sensor network inoperable. The emulator may be able to compensate for field degradation without the need for recovery of subsea elements and costly down-time. The method of an embodiment allows the recovery of communication over field life as the uncontrolled variables degrade over time, or the recovery of communication during installation due to variances in uncontrolled variables.

In summary, the SIIS Level 2 emulator addresses three concerns facing digital serial sensor devices utilising the SIIS Level 2 standard being implemented in the subsea industry:

Removes the offset distance limitation encountered when fewer than the maximum sensor nodes are installed.

Provides a safety margin during commissioning for unaccounted effects of cable capacitance due to environmental pressure effects and supplier tolerances; and due to variances in bit sampling.

Allows for asset integrity management by providing margin for cable degradation.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of increasing maximum offset distance for underwater sensors in a subsea network, the method comprising:

providing a subsea sensor network having a total termination resistance, the subsea sensor network including a sensor bus having at least one sensor connected to the sensor bus at an offset distance underwater, the at least one sensor having a termination resistance across the sensor bus;

providing an emulator for emulating at least one additional sensor on the sensor bus, wherein the emulator has at least one termination resistance and is connected electrically across the sensor bus in parallel to the termination resistance of the at least one sensor to reduce the total termination resistance across the sensor bus.

2. The method according to claim 1, wherein the emulator is a smart plug-in module.

3. The method according to claim 1, wherein the emulator is a printed circuit board assembly.

4. The method according to claim 1, wherein the emulator is a virtual sensor.

5. The method according to claim 1, wherein the sensor bus is in accordance with the Subsea Instrumentation Interface Standard.

6. The method according to claim 1, wherein the emulator is emulated as a sensor connected in a star topology network.

7. The method according to claim 1, wherein the emulator is emulated as a sensor connected in a daisy chain topology network.

8. The method according to claim 1, wherein the sensor bus is connected to a subsea control module.

9. The method according to claim 8, wherein the emulator is emulated between the subsea control module and the sensor bus.

10. The method according to claim 8, wherein the emulator is emulated within the subsea control module.

11. The method according to claim 8, wherein the subsea control module comprises a subsea electronic module; and wherein the emulator is emulated within the subsea electronic module.

12. The method according to claim 1, wherein the at least one termination resistance of the emulator is switchably connected to the sensor bus.

13. The method according to claim 1, wherein the at least one termination resistance of the emulator is a variable resistance.

14. The method according to claim 1, wherein the method is performed in an underwater hydrocarbon extraction facility.

15. A sensor network having a total termination resistance, the sensor network comprising:
a sensor bus;
at least one sensor connected electrically to the sensor bus at an offset distance, the at least one sensor having a termination resistance across the sensor bus; and
an emulator for emulating at least one additional sensor on the sensor bus, wherein the emulator includes at least one termination resistance and is connected electrically across the sensor bus in parallel to the termination resistance of the at least one sensor reducing the total termination resistance across the sensor bus.

16. The sensor network according to claim 15, wherein the emulator is a smart plug-in module.

17. The sensor network according to claim 15, wherein the emulator is a printed circuit board assembly.

18. The sensor network according to claim 15, wherein the emulator is a virtual sensor.

19. The sensor network according to claim 15, wherein the sensor bus is in accordance with the Subsea Instrumentation Interface Standard.

20. The sensor network according to claim 15, wherein the emulator is connected electrically in a star topology network.

21. The sensor network according to claim 15, wherein the emulator is connected electrically in a daisy chain topology network.

22. The sensor network according to claim 15, wherein the sensor bus is connected electrically to a subsea control module.

23. The sensor network according to claim 22, wherein the emulator is disposed between the subsea control module and the sensor bus.

24. The sensor network according to claim 22, wherein the emulator is disposed within the subsea control module.

25. The sensor network according to claim 22, wherein the subsea control module comprises a subsea electronic module; and wherein the emulator is disposed within the subsea electronic module.

26. The sensor network according to claim 15, wherein the at least one termination resistance of the emulator is switchably connected to the sensor bus.

27. The sensor network according to claim 15, wherein the at least one termination resistance of the emulator is a variable resistance.

28. The sensor network according to claim 15, wherein the sensor bus is used in an underwater hydrocarbon extraction facility.

29. The sensor network according to claim 15, wherein the emulator is a digital serial device.

30. The sensor network according to claim 15, wherein the emulator provides a digital signal along the sensor bus.

31. The sensor network according to claim 15, wherein the emulator on the sensor bus reduces the impact on the RC time constant of the sensor network.

32. The sensor network according to claim 15, wherein the emulator increases a maximum offset distance of the at least one sensor on the sensor bus.

33. The method according to claim 1, wherein at least one sensor includes a plurality of sensors, each of which connecting electrically to the sensor bus at an offset distance underwater in parallel to each other, and having a respective termination resistance across the sensor bus.

34. A subsea sensor network having a total termination resistance; the subsea sensor network comprising:
a sensor bus;
a plurality of subsea sensors connected electrically in parallel to the sensor bus at respective offset distances underwater, each of the subsea sensors having a respective termination resistance across the sensor bus; and
at least one non-sensor device having a termination resistance for emulating at least one additional subsea sensor on the sensor bus, wherein the non-sensor device is connected electrically across the sensor bus in parallel to the termination resistance of the plurality of subsea sensors reducing the total termination resistance across the sensor bus.

* * * * *